March 22, 1960   F. L. KAESTLE   2,929,963
PROTECTIVE RELAYING SYSTEM FOR DIRECT CURRENT EQUIPMENT
Filed Dec. 9, 1957
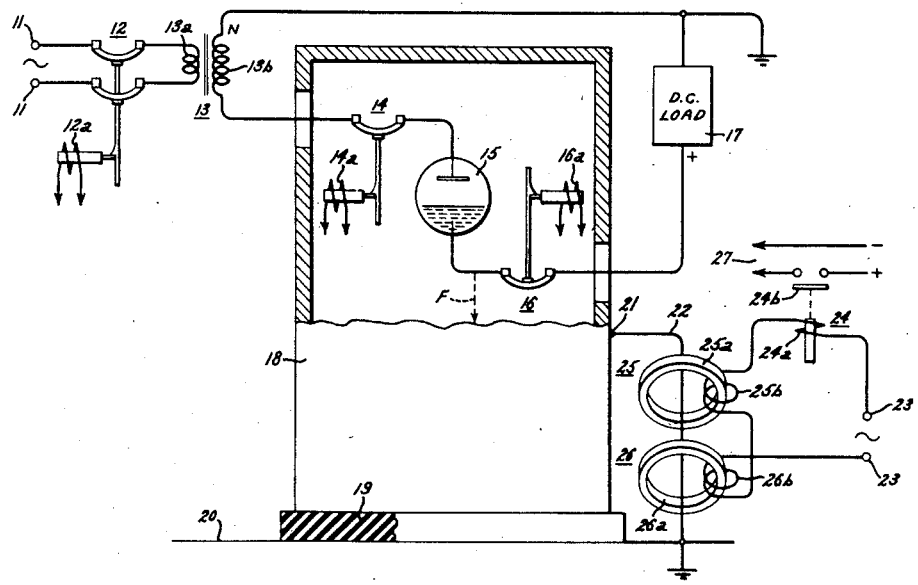
Inventor:
Francis L. Kaestle,
by J Wesley Haeuber
His Attorney.

2,929,963
Patented Mar. 22, 1960

2,929,963

PROTECTIVE RELAYING SYSTEM FOR DIRECT CURRENT EQUIPMENT

Francis L. Kaestle, Scotia, N.Y., assignor to General Electric Company, a corporation of New York Application December 9, 1957, Serial No. 701,626

2 Claims. (Cl. 317—18)

This invention relates to a protective relaying system for direct-current equipment, and more particularly to a relaying system for providing ground fault protection for direct-current electric power apparatus located in a grounded metal housing.

In the art of electric power distribution and utilization, it is common practice to locate current carrying buses and associated electric apparatus within grounded metal structures or housings. The housing is intentionally grounded so that no significant potential difference can develop between the housing and ground—in the event that the electric insulation between the housing and the "live" electric circuits within the housing should fail or otherwise be accidentally short circuited. In this way the operators, maintenance men and others who may be working in or around the equipment are protected from the dangers of electric shock upon touching the enclosing housing. Furthermore, this arrangement eliminates a fire hazard caused by the flow of ground current through leakage paths between the housing and ground.

When direct-current electric power apparatus is located in a metal housing which is connected to ground through a relatively low resistance, a particularly serious problem is created by the possibility of ground faults, i.e., the failure or short circuiting of the insulation normally maintained between the grounded housing and the direct-current circuits. Such a fault is frequently accompanied by severe electric arcing which produces unusually high temperatures and large amounts of highly conductive ionized gases in the housing. The direct-current arc tends to be self-sustaining, and in order to minimize resulting damage the faulted circuit must be isolated from all sources of electric power as rapidly as possible. Accordingly, an object of this invention is to provide an improved relaying system for initiating a protective operation in response to the occurrence of a ground fault in direct-current equipment of the type enclosed in a low-resistance grounded metal housing.

Another object of the invention is the provision of a very sensitive protective relaying system responsive to fault conditions involving direct-current electric power circuits and the grounded metal housing in which the direct-current circuits are located.

Still another object of the invention is to provide a low cost but reliable relaying system for initiating a protective function in response to ground faults in direct-current electric power apparatus located within a grounded metal housing.

In carrying out my invention in one form, I provide circuit means for grounding at one point only a metal housing that contains direct-current electric power apparatus. A pair of saturable reactors are coupled to the circuit means, each reactor including a core member having an abrupt saturation characteristic and a reactance winding mounted on the core. I provide an electroresponsive device arranged to initiate a preselected protective operation when energized by alternating current of at least a predetermined low value, and this device is connected in series circuit relationship with the reactance windings of both of the reactors to a pair of alternating voltage supply terminals. The two reactance windings are arranged in polarity-opposing relationship with respect to each other. Whenever direct current greater than a predetermined amount flows from the direct-current apparatus to the enclosing housing and hence through the circuit means to ground, the reactance windings will conduct alternating current of a value directly proportional to the magnitude of direct current in the circuit means. The electroresponsive device is energized by this alternating current.

My invention will be better understood and its various objects and advantages will be more fully appreciated from the following description taken in conjunction with the accompanying drawing the single figure of which is a schematic representation of a preferred embodiment of my invention.

The relaying system constituting my invention is used to protect direct-current equipment comprising, for example, the electric power rectifier illustrated schematically in the drawing. Although only a single phase, half-wave rectifier circuit has been shown for the purpose of illustration, it should be understood that in practice a polyphase rectifier comprising a plurality of such circuits would be provided. The input terminals 11 in the drawing represent a source of alternating-current electric power which is connected through a suitable multi-pole circuit interrupter 12 to a primary winding 13a of a power transformer 13. The power transformer 13 is provided with a secondary winding 13b having one terminal N connected to ground as shown. This grounding is either intentional or by virtue of an accidental or inadvertent ground in the connected load circuit. The other terminal of winding 13b is connected through a suitable anode circuit interrupter 14 to the anode of a unilaterally conductive power rectifier element or tube 15. The cathode of tube 15 is connected by way of a single-pole cathode circuit interrupter 16 to the positive terminal of a direct-current load 17 shown in block form. The other terminal of the load 17 either intentionally is grounded or may become grounded accidentally or unintentionally as mentioned above. The circuit interrupters 12, 14 and 16 have appropriate trip coils 12a, 14a and 16a, respectively, and the interrupters are opened by connecting these coils for energization to a suitable source of direct-current control power.

It is common practice to locate the anode and cathode interrupters 14 and 16 and the rectifying tube 15 of the power rectifier in a single metal housing 18. In accordance with my invention, the housing 18 is supported by electric insulating means such as the pad of insulating material 19 disposed, as shown in the drawing, between the housing 18 and ground 20. Thus, the base of the housing is electrically insulated from ground. But one point 21 of the housing 18 is connected to ground by suitable circuit means, such as a low resistance cable or conductor 22. If the direct-current circuits in housing 18 should accidentally come into contact with the housing structure, such as at point F, the direct-current load 17 will be shunted by a short circuit comprising the faulted point F, the housing 18, the grounding conductor 22, and the ground. Since the impedance of such a short circuit is usually very small, a large amount of ground current can flow and severe electric arcing is likely to occur at the faulted point F. The improved relaying means provided in accordance with my invention will immediately initiate a preselected protective operation in response to even a slight amount of ground current in conductor 22, whereby the faulted circuits can be quickly removed from service and the resulting damage minimized.

As can be seen in the drawing, the protective relaying system includes a pair of alternating-voltage supply terminals 23, a sensitive electroresponsive device such as the illustrated electromagnetic relay 24, and a pair of saturable reactors 25 and 26. The saturable reactors 25 and 26 have magnetizable core members 25a and 26a, respectively, which are constructed of thinly laminated high-permeability magnetic material, such as 50–50 nickel-iron alloy which has an extremely abrupt saturation characteristic. The grounding conductor 22 passes through the cores of both of the reactors 25 and 26 and comprises a one-turn control winding for each reactor.

On the core members 25a and 26a there are mounted reactance windings 25b and 26b, respectively, each having at least one turn. A closed loop circuit is formed by serially interconnecting the reactance windings 25b and 26b, the supply terminals 23 and an operating winding 24a of the electromagnetic relay 24. The reactance windings are connected in polarity-opposing relationship with respect to each other, as is indicated in the drawing. The supply terminals 23 are connected to a suitable source of alternating voltage, no shown. The alternating current supplied by the source of alternating voltage and flowing in the loop circuit is limited, in the manner that will soon be explained in detail, to a value that is directly proportional to the magnitude of direct current flowing in grounding conductor 22.

The electromagnetic relay 24 is provided with a normally open switch contact 24b. The contact 24b is arranged to initiate a preselected protective function, such as completing an energizing circuit 27 for the trip coils 12a, 14a and 16a of the circuit interrupters 12, 14 and 16, whereby these circuit interrupters are opened to disconnect the direct-current circuits in housing 18 from all sources of electric power.

The two duplicate saturable reactors 25 and 26, with their reactance windings connected in series opposition, provide a sensitive and accurate detecting or measuring means. The amplitude of alternating current supplied by the alternating-voltage source and flowing through the loop circuit including the reactance windings will be directly proportional to the direct current which saturates the reactor cores, in this case the direct current flowing in the grounding conductor 22.

Because of its high permeability and abrupt saturation characteristic, a saturable reactor changes its inductive reactance abruptly at its point of saturation. The inductive reactance attains and remains at a very high, substantially constant value when the reactor is unsaturated, and it has a very low, substantially constant value whenever the reactor is saturated. Thus, the inductive reactance changes from a high maximum to a low minimum just as the reactor becomes saturated.

Saturation of a reactor occurs when the reactor core is excited by at least a predetermined amount of ampere-turns. Ampere-turns are provided by the reactance winding receiving current from the alternating-voltage source and by the control winding conducting the direct current which is to be detected or measured. The required amount of ampere-turns for saturation may be provided either by the reactance winding or the control winding alone or by the combined effect of these two windings, and saturation of the saturable reactor will occur at the instant when the algebraic sum of the ampere-turns of both of its windings reaches the afore-said predetermined amount.

The control or saturating windings of the two reactors 25 and 26 are connected in series with the same polarity with respect to each other. This may be accomplished by using wound auxiliary control windings on the reactor cores, or, in the preferred form illustrated in the drawing, simply by passing the conductor 22, which carries the saturating direct current, in the same direction through the windows of both reactor cores 25a and 26a.

When no direct current flows in conductor 22, neither reactor is saturated and both of the reactance windings 25b and 26b present a very high reactance in the loop circuit. Therefore, a negligible current flows from the source of alternating voltage through the operating winding 24a of the relay 24. As soon as direct current of a value great enough to produce the required saturating ampere-turns is flowing in conductor 22, it tends to saturate both reactors. At the same time, current flowing from the alternating-voltage source through the oppositely poled reactance windings produces saturating ampere-turns in the same direction as those produced by the direct current in one of the reactors, and opposite to the direct-current ampere-turns in the other reactor.

The one reactor—in which the ampere-turns provided by the reactance winding are in the same direction as the direct-current ampere-turns—becomes saturated and remains so throughout a period of one-half cycle of the alternating voltage. The inductive reactance of this saturated reactor is very low, and therefore it ceases to be a controlling element for the flow of current in the loop circuit. However, the other reactor—in which the ampere-turns provided by the reactanct winding are opposed to the direct-current ampere turns—becomes unsaturated and abruptly increases its reactance in order to maintain a balance between the ampere-turns of the direct saturating current in its control winding and the empere-turns of the desaturating current in its reactance winding. In its unsaturated, high-reactance state, this reactor controls the flow of current in the loop circuit. For any given value of saturating curent in conductor 22, a directly proportional value of current flows in the loop circuit. Any tendency for the latter current to decrease would enable the ampere-turns of the direct saturating current to saturate the reactor, thereby abruptly reducing the reactance of the associated reactance winding. This would permit more current to flow in the loop circuit until the ampere-turn balance is restored. Any tendency for the current to increase would produce ampere-turns further unsaturating the core thereby increasing the reactance of the winding and causing less current to flow until the ampere-turn balance is again restored.

During the succeeding one-half cycle of alternating voltage, the current in the loop circuit reverses direction and the action of the two saturable reactors will be exactly reversed from that described above. The one which was previously controlling now becomes saturated and ceases to control. The one which was saturated becomes controlling and maintains the ampere-turn balance.

Because of the abrupt saturation characteristics of the reactors 25 and 26, the alternating current which flows in the loop circuit has a "square" wave form. This is due to the fact that the ampere-turn balance is maintained instant-by-instant, from the beginning to the end of each half-cycle of operation, and the value of saturating direct current in conductor 22 remains substantially constant. Consequently, the magnitude of loop-circuit current must be substantially constant, although the direction of this current reverses every half-cycle as the two saturable reactors alternate their functions.

Furthermore, because of the balanced ampere-turn relation, the current which flows from the source of alternating voltage is not critically dependent upon the magnitude or frequency of the source voltage or upon the "load" imposed in the series loop circuit by the operating coil of the electromagnetic relay 24. By proper selection of the core design and turns ratio of the saturable reactors, a very small magnitude of direct current in conductor 22 will establish in the loop circuit a sufficient magnitude of current to operably energize the relay 24. The sensitivity of my relaying system is dependent upon the sensitivity (minimum pick-up current) of the relaying device. By the selection of a very sensitive relay, an extremely sensitive relaying system is obtained.

From the foregoing detailed description of my protective relaying system, its mode of operation may now be readily followed. When a ground fault occurs in the protected equipment and ground current greater than the low saturating value flows in conductor 22, a "square-wave" alternating current of directly proportional value will flow from the power source terminals 23, through the electromagnetic relay coil 24a and through the reactance windings 25b and 26b of the saturable reactors 25 and 26. When this alternating current is greater than the minimum required to operate the electromagnetic relay 24, contact 24b closes thereby completing the energizing circuit 27 for the tripping coils 12a, 14a and 16a of the circuit interrupters 12, 14, and 16. These interrupters disconnect the direct current circuits in housing 18 from all sources of electric power. In this manner the ground fault current is detected and all sources of power from which current was flowing in the faulted circuit are interrupted quickly.

Thus my protective relay system is responsive to ground current, and by selecting a very sensitive electromagnetic relay 24, an appropriate protective operation can be initiated whenever a relatively small magnitude of ground current flows in the grounding conductor 22.

While I have shown and described a preferred form of my invention by way of illustration, many modifications will occur to those skilled in the art. I therefore contemplate by the claims which conclude this specification to cover all such modifications as fall within the true spirit and scope of my invention.

What I claim as new and desire to secure by Letters Patent of the United States is:

1. In a protective relaying system for direct-current electric power apparatus located in a metal housing that is electrically insulated from ground at all points except one, first and second supply terminals adapted to be connected to a source of alternating voltage; an electromagnetic relay connected to said first supply terminal and arranged to initiate a preselected protective operation when energized by alternating current of at least a predetermined value; a pair of saturable reactors each comprising a core member having an abrupt saturation characteristic, a control winding for saturating said core member when energized by direct current greater than a predetermined amount, and a reactance winding mounted on said core member; circuit means including the control windings of said reactors for connecting the metal housing to ground at one point only, whereby both of the control windings are energized whenever direct current flows from the direct-current apparatus to the housing and hence through said circuit means to ground; and means serially connecting the reactance windings of said reactors in polarity-opposing relationship between said second supply terminal and said electromagnetic relay, whereby said electromagnetic relay is energized by alternating current supplied by the source of alternating voltage and limited by the reactance windings to a value directly proportional to the magnitude of ground current flowing in said circuit means.

2. In a protective relaying system for direct-current electric power circuits located in a metal housing that is supported by electric insulating means: alternating-voltage supply terminals; an electroresponsive device arranged to initiate a preselected protective function when energized by alternating current having a value great enough to operate the electroresponsive device; a pair of saturable reactors each comprising a core member having an abrupt saturation characteristic, a control winding for saturating said core member when energized by direct current greater than a predetermined low magnetizing current, and a reactance winding disposed on said core; circuit means including the control windings of said reactors for connecting the metal housing to ground at one point, whereby said control windings are energized by unidirectional ground current flowing from the direct-current circuits to the housing and hence through said circuit means to ground; and means connecting said electro-responsive device and the reactance windings of said reactors in series circuit relationship to said alternating-voltage supply terminals, said reactance windings being arranged in polarity-opposing relationship with respect to each other whereby the alternating current energizing said electro-responsive device is limited by the action of said saturable reactors to a value directly proportional to said ground current when above the low magnetizing current of the saturable reactors.

References Cited in the file of this patent

UNITED STATES PATENTS

| 1,539,834 | Gaarz | June 2, 1925 |
| 2,835,827 | Kramer | May 20, 1958 |

FOREIGN PATENTS

| 920,383 | Germany | Nov. 22, 1954 |